United States Patent [19]
Guscott

[11] Patent Number: 4,707,604
[45] Date of Patent: Nov. 17, 1987

[54] CEILING MOUNTABLE PASSIVE INFRARED INTRUSION DETECTION SYSTEM

[75] Inventor: John K. Guscott, Lynnfield, Mass.

[73] Assignee: ADT, Inc., Parsippany, N.J.

[21] Appl. No.: 790,457

[22] Filed: Oct. 23, 1985

[51] Int. Cl.[4] .......................... G01J 1/00; G08B 13/18

[52] U.S. Cl. .................................... 250/342; 250/353; 340/555; 340/567; 350/619

[58] Field of Search ................ 250/342, 353; 340/555, 340/567; 350/619

[56] References Cited

U.S. PATENT DOCUMENTS

| | | | |
|---|---|---|---|
| 3,036,219 | 5/1962 | Thompson | 250/220 |
| 3,453,432 | 7/1969 | McHenry . | |
| 3,524,180 | 8/1970 | Cruse . | |
| 3,551,676 | 12/1970 | Runnels . | |
| 3,631,434 | 12/1971 | Schwartz | 250/208 |
| 3,703,718 | 11/1972 | Berman . | |
| 3,886,360 | 5/1975 | Reiss et al. | 250/353 |
| 4,268,752 | 5/1981 | Herwig et al. | 250/353 |
| 4,342,987 | 8/1982 | Rossin | 340/555 |
| 4,375,034 | 2/1983 | Guscott | 250/342 |
| 4,385,833 | 5/1983 | Gardner | 356/141 |
| 4,514,630 | 5/1985 | Takahashi | 250/353 |
| 4,514,631 | 4/1985 | Guscott | 250/342 |

*Primary Examiner*—Stephen C. Buczinski
*Attorney, Agent, or Firm*—Weingarten, Schurgin, Gagnebin & Hayes

[57] ABSTRACT

The disclosed ceiling mountable passive infrared intrusion detection system includes a field forming mirror assembly and a focusing mirror assembly cooperative to provide a field of view having plural first vertical curtains, a generally disc-shaped horizontal second curtain, and a generally conical downwardly directed third curtain. In one embodiment, first and second conical field forming mirrors are cooperative with different and spaced-apart spherical focusing mirrors to provide the horizontal curtain and the downwardly directed conical curtain. An unbalanced detector is disclosed that cooperates with the energy pattern received from the conical field forming mirrors to signal intruder presence. In another embodiment, first and second pluralities of planar field forming mirrors are cooperative with the different and spaced-apart spherical focusing mirrors to respectively provide a first plurality of substantially horizontal finger beams and a second plurality of plural downwardly directed finger beams. In this embodiment, a balanced detector is disclosed that cooperates with the energy pattern received from the first and second pluralities of finger beams to signal intruder presence.

21 Claims, 9 Drawing Figures

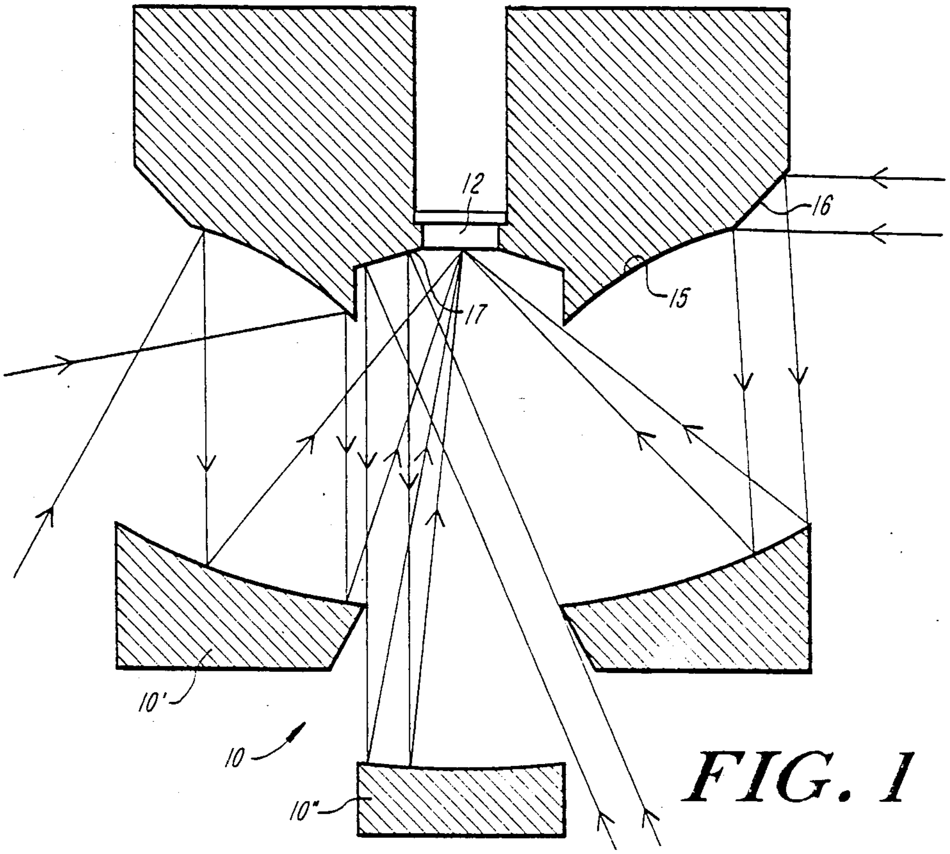
FIG. 1
FIG. 2
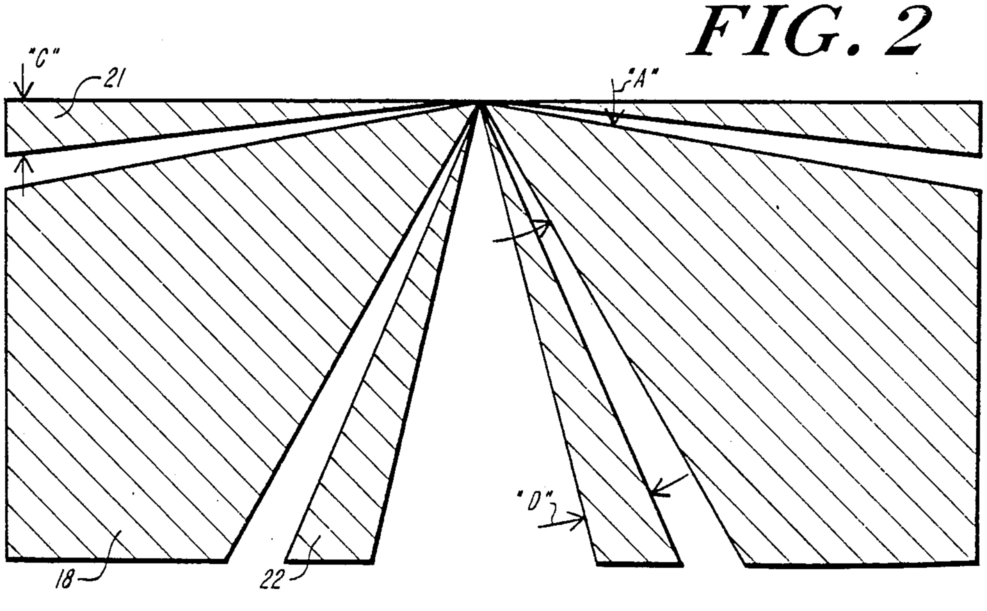

CEILING MOUNTABLE PASSIVE INFRARED INTRUSION DETECTION SYSTEM

CROSS REFERENCE TO RELATED APPLICATIONS

This invention is related to U.S. Pat. No. 4,375,034 and to U.S. utility patent application Ser. No. 454,852, U.S. Pat No. 4,514,631 both the same inventive entity and assigned to the same assignee as herein, and both incorporated herein by reference.

FIELD OF THE INVENTION

This invention relates to intrusion detection systems and more particularly to a ceiling mountable passive infrared intrusion detection system.

BACKGROUND OF THE INVENTION

Passive infrared intrusion detection systems are known for sensing the presence of an intruder in a protected space and for providing an output signal representative of intruder detection. Examples of passive infrared intrusion detection systems are shown in U.S. Pat. Nos. 3,036,219; 3,524,180; 3,631,434; 3,703,718; and 3,886,360. It is an object of the present invention to provide a system and a mirror assembly therefor especially suited to ceiling mounting to produce a field of view through which an intruder must pass when moving about the floor area of a protected region, through which an intruder must pass when moving between the ceiling and the floor of the protected area, and through which an intruder must pass when moving on the floor and directly below the mirror assembly.

SUMMARY OF THE INVENTION

Briefly, the ceiling mountable passive infrared intrusion detection system of the present invention provides a plurality of radially outwardly extending generally vertical first curtains symmetrically disposed azimuthally, either a generally disc shaped thin second curtain or a first plurality of circumferentially symmetrically disposed finger beams both transverse the vertical curtains, and either a conical third curtain or a second plurality of circumferentially symmetrically disposed finger beams both generally downwardly directed and nested within the field of view of the vertical curtains and of the field of view of the curtain transverse the first curtains. Each of the vertical curtains have a relatively broad field of view in the vertical plane and a relatively narrow field of view in the horizontal plane. The vertical curtains are arranged within a facility being monitored such that an intruder must traverse these curtains when in motion about the floor of the protected area and thereby trigger an intruder alarm. Either the generally disc-shaped thin second curtain or the plural first finger beams extend 360° azimuthally. The generally disc-shaped second curtain, and each of the plural first finger beams are relatively narrow in the vertical direction, and are arranged within a facility being monitored such that an intruder must traverse therethrough when in motion between the ceiling and the floor of the area to be protected and thereby trigger an intruder alarm. Either the generally downwardly directed conical third curtain or the second plurality of finger beams are arranged within a facility being monitored such that an intruder must traverse therethrough when in motion about that region of the floor of the area to be protected defined directly below the detector.

The system includes a mirror assembly having a two-part and split-apart focusing mirror subassembly one element of which is cooperative with each one of an array of adjacent cylindrical mirror facets to provide the field of view of the vertical curtains. The cylindrical mirror facets are symmetrically disposed around 360° of azimuth to provide multiple generally vertical first curtains. A conical mirror is cooperative with the same element of the split focusing mirror assembly to provide the field of view of the generally disc-shaped second curtain. The conical mirror is concentrically disposed outwardly of the array of adjacent cylindrical mirror facets. A second conical mirror concentrically disposed within both the first conical mirror and the cylindrical facet array is cooperative with the other element of the split focusing mirror subassembly to provide the field of view of the generally downwardly directed conical third curtain. In the alternative embodiment, a plurality of planar facets outwardly adjacent a corresponding one of the plural cylindrical facets are cooperative with the first focusing mirror subassembly element to provide the field of view of the first plurality of finger beams. A plurality of second planar facets concentrically disposed within and aligned with corresponding ones of the first plurality of planar facets are cooperative with the other element of the focusing mirror subassembly to provide the second plurality of finger beams that provide a field of view that protects the general region below the detector.

An infrared detector is disposed along the optical axis of the split focusing mirror subassembly and at the foci thereof to provide an electrical signal in response to received radiation from the field of view of the first curtains, from the field of view of either the second curtain or the first plurality of finger beams, and from the field of view of either the generally downwardly directed third curtain or the second plurality of finger beams representative of intruder presence. In the first embodiment, an unbalanced infrared detector is disclosed, and in the second embodiment, a balanced infrared detector is disclosed. The detector signals are electronically processed in both embodiments to provide an output indication of intruder presence when moving about the floor or through the air space of the protected facility.

DESCRIPTION OF THE DRAWINGS

The invention will be more fully understood from the following detailed description taken in conjunction with the accompanying drawings in which:

FIG. 1 is a sectional view of a mirror assembly embodying the present invention;

FIG. 2B showns an elevational view of the fields of view of the mirror assembly of the present invention;

DETAILED DESCRIPTION OF THE INVENTION

Figure 2A:
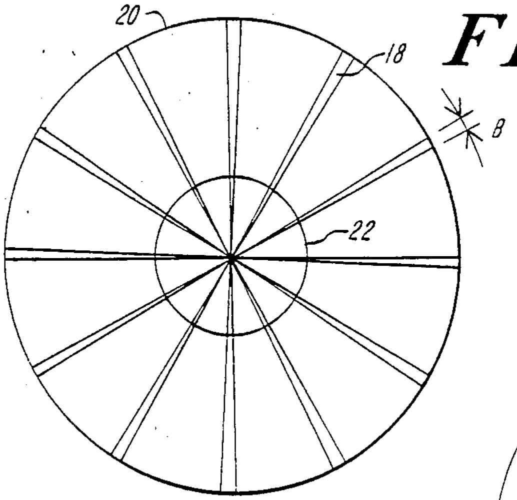
FIG. 2A shows a plan view of the field of view of the mirror assembly of the present invention.

Referring now to FIG. 1, there is shown a sectional view of a novel mirror assembly illustrating a ceiling mountable passive infrared intrusion detection system in accordance with the invention. The mirror assembly includes a split focusing mirror generally designated 10, an infrared detector 12 disposed along the optical axis of the split mirror 10 and at the common-foci thereof, a circular array of adjacent cylindrical mirror facets 15 each oriented to provide a predetermined first field of view and to cooperate with the mirror assembly 10 to direct infrared radiation within the associated field of view to the cooperative portion of the mirror assembly 10 and thence to detector 12, a first conical mirror 16 oriented to provide a predetermined second field of view and to cooperate with mirror assembly 10 to direct infrared radiation within the second field of view to the cooperative portion of the mirror assembly 10 and thence to the detector 12, and a second conical mirror 17 oriented to provide a predetermined third field of view and to cooperative with the mirror assembly 10 to direct infrared radiation within the third field of view to the cooperative portion of the mirror assembly 10 and thence to the detector 12. Preferably, the mirrors 15 have their cylindrical axes orthogonal to the optical axis of the mirror assembly 10, and the mirrors 16, 17 have their longitudinal axes coincident with the optical axis of the mirror assembly 10. The detector 12 is operative to provide electrical signals in response to received infrared radiation that are electroncially processed in well-known manner to provide an output indication of intruder presence about the floor and in the air space of a protected facility.

Figure 3A:
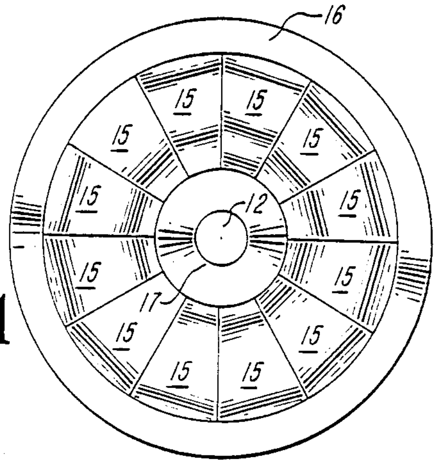
FIG. 3A and FIG. 3B are different scale plan views of alternative embodiments of the field forming mirror subassembly of the mirror assembly of the present invention.

In typical use, the mirror assembly is oriented with the optical axis of the mirror assembly 10 and the longitudinal axes of the mirrors 16, 17 vertical and the axes of the mirrors 15 horizontal. The cylindrical mirror facets 15 allow each of the associated fields of view to be relatively narrow in the horizontal plane, as shown in FIG. 2A, and relatively large in the vertical plane, as shown in FIG. 2B. The horizontal field of view or divergence angle designated "B" (FIG. 2A) is controlled by the focal length of the cooperating element of the split focusing mirror assembly 10. The curvature and arclength of the cylindrical miror facets 15 are determined in relation to the curvature of the cooperative focusing mirror assembly element to provide the intended vertical field of view or vertical divergence angle designated "A" (FIG. 2B). The front and rear edges of the cylindrical mirror facets 15 determine the limits or extent of the vertical field of view. The forward edge delimits the lower boundary of the field of view, while the uppper boundary of this field of view is determined by the rearward edge. In the illustrated embodiment, a vertical divergence angle of about 50° typically is provided, while a horizontal divergence angle of about 5° typically is provided. As illustrated in FIG. 3A, twelve such adjacent cylindrical mirror facets 15 are symmetrically arranged circumferentially about 360° of azimuth to provide the twelve first curtains 18 (FIGS. 2A, 2B) having a generally vertical field of view (FIG. 2B). The field of view of the generally vertical first curtains in the illustrated embodiments extends from about 15° to about 65° below the horizontal. The range of the first curtains depends on the focal length of the cooperative element of the mirror assembly 10 and upon the size of the detector 12. Typically, the focal length and element size are selected to image a human-size target at at nominal range. As a result, the area to be protected is fully protected agains intruder translation about the floor of the protected space. Although twelve circumferentially symmetrically disposed cylindrical mirror segments are specifically illustrated, a greater or a lesser number of symmetrically or non-symmetrically arranged mirrors can be employed as well without departing from the inventive concept.

The conical mirror 16 allows the field of view of the second curtain to be generally disc-shaped and to extend 360° azimuthally as shown at 20 in FIG. 2A, and to be relatively narrow in elevation as shown at 21 in FIG. 2B. The extent of elevational variation, the so-called drop-through angle designated "C" (FIG. 2B), is determined by the focal length of the coopertive element of the mirror assembly 10 and the size of the detector 12. Typically, a 2.5° drop-through angle is obtained in the illustrated embodiment. As a result of the second field of view provided by the conical mirror 16, the area to be protected is fully protected against intruder translation between the ceiling and the floor of the protected area.

The conical mirror 17 allows the field of view of the third curtain to be generally cone-shaped, and it is disposed centrally within the several mirrors 15, 16 in such a way as to provide a generally downwardly directed zone of protection 22 (FIGS. 2A, 2B) disposed centrally within the several vertical curtains 18. The angle of the cone-shaped zone 22 designated "D" is determined by the focal length of the cooperative element of the mirror assembly 10 and the size of the detector 12. Typically, about a 3.5 angle is obtained in the illustrated embodiment. As a result of the third field of view provided by the conical mirror 17, the area directly below the detector is fully protected against intruder translation on the floor of the area to be protected.

Figure 4A:
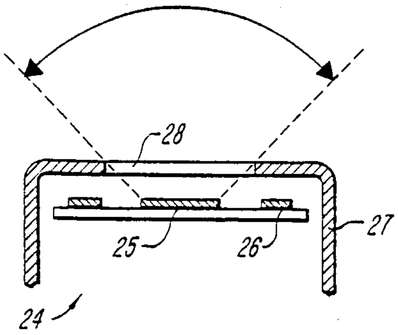
FIG. 4A shows an elevational view and FIG. 4B shows a plan view of the detector subassembly of the mirror assembly of the present invention.
Figure 4B:
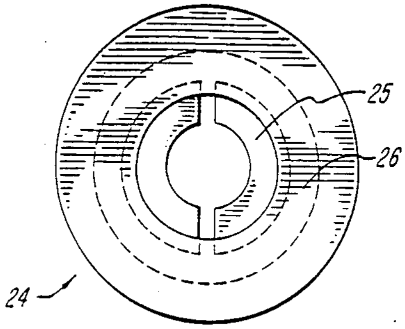

The focusing mirror assembly 10 is split into component elements 10', 10" cooperative with field forming mirror assembly elements 15, 16 and 17 to provide the fields of view of the first, second and third curtains. The elements 10', 10" each have a different focal length, and are axially spaced apart along the longitudinal axis of the detector assembly to provide an aperture therebetween that allows IR energy present generally below the assembly to be incident on the detector 12. Because the field of view of the third curtain fully provides coverage of the protected facility below the detector, the optical aperture of the mirrors 15, 16 is thereby freed to be utilized to provide a downrange detection sensitivity, via the plural first curtains, that otherwise would not be possible. The present invention therewith achieves a more efficient distribution of the system optical aperture. The conical mirrors 16, 17 bring optical energy present in the second and third curtains to the detector 12 in such a way that the energy is "smeared" due to the curvature of the mirrors 16, 17. A detector assembly of the so-called unbalanced type suitable for use with the "smeared" energy pattern provided by the field-forming conical mirrors 16, 17 is generally designated at 24 in FIGS. 4A, 4B. The detector 24 includes inner and outer equal-area infrared detectors 25, 26 mounted in a housing 27 having an infrared transparent window 28 such that infrared energy received thereby is incident only on the central detector 25. The "smeared" energy pattern of the IR energy received via the conical field-forming mirrors 16, 17 that is incident on the unbalanced detector assembly 24 thereby provides a signal indication of intruder presence.

Figure 3B:
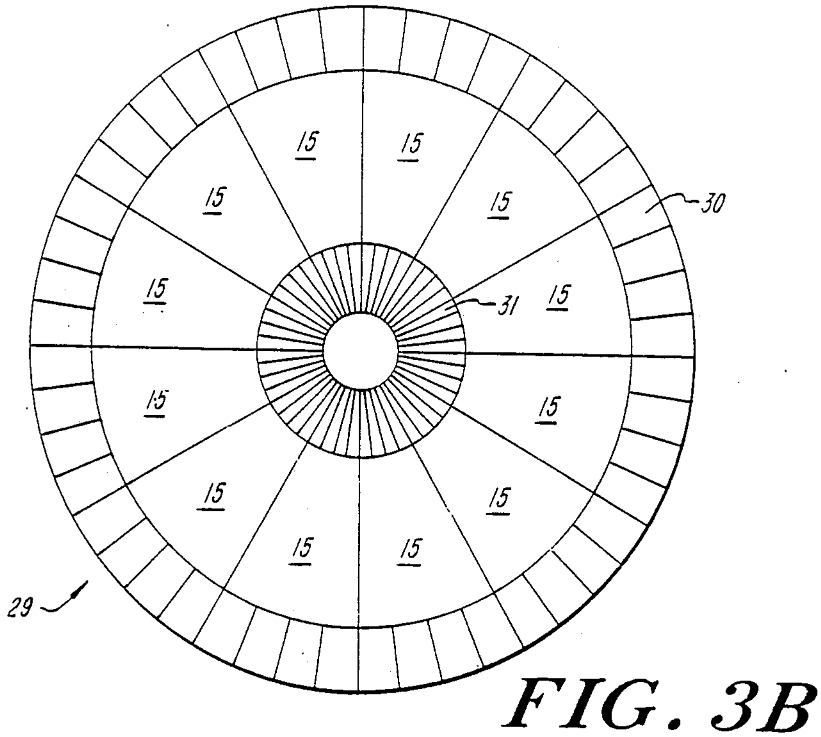

Referring now to FIG. 3B, generally designated at 29 is an alternate embodiment of the field-forming mirror assembly of the present invention. The assembly 29 like the assembly illustrated in FIG. 3A has plural cylindrical facets 15 defining a corresponding one of the fields of view of the generally vertical curtains 18 (FIGS. 2A, 2B). The assembly 29 differs therefrom insofar as a first plurality of planar mirror facets 30 replace the conical mirror 16, and a second plurality of planar mirror facets 31 replace the conical mirror 17. The first and second pluralities of planar facets 30, 31 are circumferentially spaced symmetrically about the field forming mirror assembly 29 and are individually cooperative with a corresponding element 10', 10" of the split focusing mirror assembly 10 (FIG. 1) to provide an associated one of first and second pluralities of circumferentially symmetrically oriented finger beams. While any number of facets 30, 31 can be employed, in the illustrated embodiment forty-eight such facets have been found to be sufficient to provide an effectively continuous coverage of the field of view provided by the second and third curtains of the embodiment of the field forming mirror assembly of the FIG. 3A embodiment. The energy pattern of the facets 30, 31 is not-smeared at the detector 12 as is the case for the conical mirrors of the first embodiment, so that a so-called balanced detector can be employed therewith.

Figure 5A:
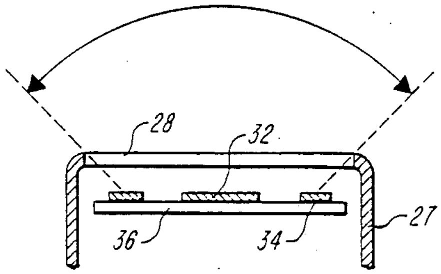
FIG. 5A shows an elevational view and FIG. 5B shows an alternate embodiment of the detector subassembly of the mirror assembly of the present invention.
Figure 5B:
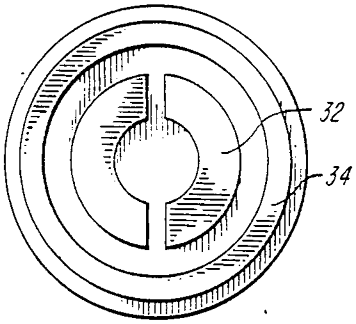

The balanced detector subassembly of the present invention is shown in FIGS. 5A, 5B and includes an inner infrared sensitive element 32 and an outer infrared sensitive element 34 concentric therewith and of equal area. The elements 32 and 34 are formed on a pyroelectric substrate 36. As shown in FIG. 5A a housing 27 having a window 28 is provided such that both the central sub-element 32 and the sub-element 34 are in external radiation receiving relationship. Any suitable pyroelectric substrate can be utilized such as thickness poled ceramic PZT, lithium tantalate, and polyvinylidene flouride, among others. As shown in FIG. 1, the detector 12 in both embodiments is preferably mounted in a recess provided therefor to help protect it from unwanted radiation and air turbulence. It should b noted that the detector can be otherwise mounted in a position intended to receive infrared radiation without departing from the inventive conecpt.

The shape of the cylindrical mirrors can be varied to control the system aperture to vary the system sensitivity across the viewing fields. For example, the cylindrical mirrors can be structured or shaped to provide lower sensitivity to objects near the detector and higher sensitivity to objects further removed from the detector. A smaller cylindrical surface area provides a smaller aperture and therfore lower sensitivity. While the image at the detector is distorted by the cylindrical mirrors, such distortion is not of any material detriment to system performance, since intruder detection is based upon the change in received radiation due to a moving intruder entering or leaving corresponding ones of the fields of view rather than precise imaging of the intruder onto the detector. The elements of the split focusing mirror assembly preferably are spherical segments.

The invention thus provides a ceiling mountable passive infrared intrusion detection system in which one or more first solid curtains of protection are provided to achieve an area of survelliance which cannot readily be compromised or circumvented by an intruder in translation about the floor area whether by crawling or by jumping, in which a second curtain of protection transverse the one or more first curtains is provided to achieve an area of survelliance which cannot be readily compromised or circumvented by an intruder whether dropping into the area to be protected such as through an unauthorized hole in the ceiling of the protected area or scaling upwardly to the ceiling such as on a rope, and in which a third curtain of protection is provided to protect intruder motion directly below the mirror assembly. The optical aperture can be easily controlled by shaping of the cylindrical mirror surfaces. Uniform detection sensitivity is obtained irrespective of the range of an intruder.

It will be appreciated that many modifications of the presently disclosed invention can be effected without departing from the scope of the appended claims.

I claim:

1. A ceiling mountable passive infrared intrusion system for detecting an intruder when present on the floor of an area to be protected and when present between the ceiling and the floor of the area to be protected, comprising:

a first mirror for focusing radiation incident thereon at a focus;

means including a second mirror for providing a curtain like first field of view that has a nominal range, a comparatively narrow azimuthal extent, and a comparatively wide elevational extent, and cooperative with the first mirror for directing the radiation present in the first field of view onto the focus;

means including a third mirror for providing a generally disc-like second field of view that is generally transverse the first field of view that has a nominal range, a comparatively narrow elevational extent, and a comparatively wide azimuthal extent, and cooperative with the first mirror for directing the radiation present in the second field of view onto the focus;

a fourth mirror for focusing radiation incident thereon at said focus and in spaced relation to said first mirror defining therebetween an opening;

means including a fifth mirror for providing a generally-conical third field of view through said opening and cooperative with said fourth mirror for directing radiation present in the third field of view onto said focus; and an infrared detector positioned at said focus of the first and fourth mirros and along the optical axis thereof and operative in response to the radiation focused thereat to provide an electrical signal representative of intruder presence.

2. The system of claim 1, wherein the first mirror is a focusing mirror having a two-dimensional surface selectively curved along both of the dimensions of the focusing mirror.

3. The system of claim 2, wherein the focusing mirror is spherical.

4. The system of claim 1, wherein said second mirror is a field forming mirror having a two-dimensional surface selectively curved along only one of the dimensions of the two-dimensional surface.

5. The system of claim 4, wherein the field-forming mirror is cylindrical.

6. The system of claim 4, wherein said means including a second mirror further includes additional second mirrors each cooperative with the first mirror for providing additional first fields of view selectively spaced apart over 360 degrees of azimuth.

7. The system of claim 1, wherein the third mirror has a geometry which is a figure of revolution.

8. The system of claim 7, wherein the comparatively broad azimuthal extent of the field of view of the third mirror extends a full 360 degress of azimuth.

9. The system of claim 8, wherein the third mirror is a truncated cone.

10. The system of claim 1, wherein the detector is a bi-element detector having a central first sub-element and a concentric second sub-element each of equal areas, and further includes a detector housing having an infrared transparent window, and wherein the bi-element detector is mounted in the housing so that the central first sub-element is exposed to radiation and the second concentric subelement is concealed from radiation to provide temperature and vibration stability.

11. The system of claim 1, wherein the detector is a bi-element detector having concentric first and second sub-elements of equal areas, and further includes a detector haousing having an infrared transparent window, and wherein the bielement detector is mounted in the housing such that both elements thereof are in external radiation receiving relationship.

12. The system of claim 8, wherein the truncated cone has an apex, and wherein the bi-element detector is mounted in a chamber formed below the apex of the truncated cone to minimize the reception of unwanted radiation.

13. The system of claim 4, wherein the arc length of the cylindrical field forming mirror determines the elevational extent of the first field of view.

14. The system of claim 13, wherein the focal length of the focusing mirror and the size of the detector cooperate to determine the azimuthal extent of the first field of view.

15. The system of claim 14, wherein the focal length of the first mirror and the size of the detector cooperate to determine the elevational extent of the second field of view.

16. The system of claim 1, wherein the second means including a third mirror is a conical mirror.

17. The system of claim 1, wherein the third mirror is a planar facet, and wherein the means including a third mirror includes a plurality of planar facets spacially disposed uniformly circumferentially symmetrically to provide said generally disc-shaped second field of view.

18. The system of claim 17, wherein said fourth mirror is a spherical mirror.

19. The system of claim 1, wherein said third means including a fifth mirror is a conical mirror.

20. The system of claim 1, wherein said fifth mirror is a planar facet, and wherein said means including said fifth mirror includes a plurality of planar facets spacially disposed uniformly circumferentially symmetrically to provide said generally-conical third field of view.

21. The system of claim 20, wherein said fourth mirror is a spherical segment.

* * * * *